United States Patent
Liu et al.

(10) Patent No.: US 8,855,899 B2
(45) Date of Patent: Oct. 7, 2014

(54) VIRTUAL TRAFFIC SENSORS

(75) Inventors: Kungwel Liu, Chandler, AZ (US); Susan S. Chen, Chandler, AZ (US); Merlin J. Smith, Chandler, AZ (US)

(73) Assignee: Garmin Switzerland GmbH (CH)

( * ) Notice: Subject to any disclaimer, the term of this patent is extended or adjusted under 35 U.S.C. 154(b) by 975 days.

(21) Appl. No.: 12/272,403

(22) Filed: Nov. 17, 2008

(65) Prior Publication Data

US 2009/0287402 A1 Nov. 19, 2009

Related U.S. Application Data

(60) Provisional application No. 61/053,306, filed on May 15, 2008.

(51) Int. Cl.
*G01C 21/00* (2006.01)
*G01C 21/26* (2006.01)
*G01C 21/20* (2006.01)
*G08G 1/01* (2006.01)

(52) U.S. Cl.
CPC .............. *G08G 1/0104* (2013.01); *G01C 21/26* (2013.01); *G01C 21/20* (2013.01)
USPC ............. 701/117; 701/23; 701/119; 701/121; 701/420; 701/533; 340/919; 340/936; 340/991; 340/994

(58) Field of Classification Search
CPC ........... G08G 1/00; G01C 21/00; G01S 19/00
USPC ............... 701/117, 1, 420, 533, 23, 119, 121; 340/919, 994, 936, 991
See application file for complete search history.

(56) References Cited

U.S. PATENT DOCUMENTS

| | | | | |
|---|---|---|---|---|
| 6,061,625 A | 5/2000 | Fastenrath | ..................... | 701/117 |
| 6,092,020 A | 7/2000 | Fastenrath et al. | ............ | 701/119 |
| 6,192,312 B1 * | 2/2001 | Hummelsheim | ............. | 701/118 |

(Continued)

FOREIGN PATENT DOCUMENTS

| | | |
|---|---|---|
| JP | 2004-085486 | 3/2004 |
| JP | 2004-234649 | 8/2004 |
| JP | 2005-091084 | 4/2005 |
| JP | 2008-058112 | 3/2008 |

OTHER PUBLICATIONS

Printout from http://www.tomtom.com/page/iq-routes, 6 pages, published prior to Nov. 17, 2008.

(Continued)

*Primary Examiner* — John R Olszewski
*Assistant Examiner* — Truc M Do
(74) *Attorney, Agent, or Firm* — Samuel M. Korte; Mohammad M. Ali

(57) ABSTRACT

Techniques are described for virtual traffic sensors (VTS). In an implementation, an electronic device provides a variety of functionality including at least functionality to determine position. The electronic device may be further configured to ascertain locations of one or more virtual traffic sensors. In at least some embodiments, locations of virtual traffic sensors are determined by the electronic device using a variety of VTS criteria. Using a determined position, the electronic device may detect proximity to the virtual traffic sensors. The electronic device may collect traffic related data when in proximity to the one or more virtual traffic sensors. The electronic device may then communicate the collected traffic data over a suitable network connection to a service provider.

25 Claims, 5 Drawing Sheets

(56) References Cited

U.S. PATENT DOCUMENTS

| | | | |
|---|---|---|---|
| 6,202,024 B1* | 3/2001 | Yokoyama et al. | 701/207 |
| 6,236,933 B1 | 5/2001 | Lang | 701/117 |
| 6,577,946 B2* | 6/2003 | Myr | 701/117 |
| 7,813,870 B2* | 10/2010 | Downs et al. | 701/117 |
| 7,835,858 B2* | 11/2010 | Smyth et al. | 701/208 |
| 7,899,611 B2* | 3/2011 | Downs et al. | 701/117 |
| 8,275,540 B2* | 9/2012 | Downs et al. | 701/118 |
| 2002/0026278 A1* | 2/2002 | Feldman et al. | 701/117 |
| 2003/0033083 A1* | 2/2003 | Nakashima et al. | 701/211 |
| 2003/0083809 A1 | 5/2003 | Hatano | 701/207 |
| 2004/0030670 A1* | 2/2004 | Barton | 707/1 |
| 2005/0149251 A1* | 7/2005 | Donath et al. | 701/200 |
| 2005/0222751 A1* | 10/2005 | Uyeki | 701/117 |
| 2005/0222763 A1* | 10/2005 | Uyeki | 701/210 |
| 2007/0150185 A1* | 6/2007 | Nagase et al. | 701/209 |
| 2007/0208492 A1* | 9/2007 | Downs et al. | 701/117 |
| 2007/0208496 A1* | 9/2007 | Downs et al. | 701/117 |
| 2007/0225894 A1* | 9/2007 | Tsukamoto | 701/117 |
| 2007/0294023 A1* | 12/2007 | Arcot et al. | 701/117 |
| 2008/0071465 A1* | 3/2008 | Chapman et al. | 701/117 |
| 2008/0140305 A1* | 6/2008 | Kim et al. | 701/117 |
| 2011/0035141 A1* | 2/2011 | Barker et al. | 701/119 |
| 2011/0112747 A1* | 5/2011 | Downs et al. | 701/118 |
| 2011/0313633 A1* | 12/2011 | Nath et al. | 701/70 |
| 2011/0313654 A1* | 12/2011 | Olson et al. | 701/201 |
| 2012/0095680 A1* | 4/2012 | Olson et al. | 701/516 |
| 2012/0136561 A1* | 5/2012 | Barker et al. | 701/118 |
| 2013/0289862 A1* | 10/2013 | Chapman et al. | 701/118 |

OTHER PUBLICATIONS

Printout from http://www.dash.net/product/traffic-ddn.php, 2 pages, published prior to Nov. 17, 2008.

Fastenrath, Dr. Ulrich; Floating Car Data on a Larger Scale; Gesellschaft für Verkenhrsdaten mbH; 10 pages; 1997.

U.S. Appl. No. 12/272,466, filed Nov. 17, 2008.

International Search Report from corresponding International Application No. PCT US2009/039345, dated Jan. 13, 2010.

* cited by examiner

VIRTUAL TRAFFIC SENSORS

RELATED APPLICATIONS

This Application, under the provisions of 35 U.S.C. §119 (e), claims the benefit of priority to U.S. Provisional Application Ser. No. 61/053,306, filed May 15, 2008, entitled "Traffic System" the disclosure of which is incorporated herein by reference in its entirety.

BACKGROUND

Traditional traffic solutions involve aggregating traffic information from various sources that rely on costly deployment and monitoring of road side sensors, dedicated traffic reporters, often in helicopters, or police units responding to accidents. Also, the process of aggregating traffic information from such wide variety of sources relies heavily on humans which are proven error-prone. Another type of traffic solution involves collecting historical traffic data and providing statistical travel speed for route planning. Historical data analysis provides a good approximation about what the traffic condition should look like. However, it lacks timely feedback of what's happening in real-time. This solution also relies heavily on accurate and complete sources of historical data. Conversely, real-time traffic reporting solutions typically require traffic data to be continuously reported to central traffic severs—regardless of the relevance of the traffic data—at great expense to network and processing bandwidth.

SUMMARY

Techniques are described for virtual traffic sensors (VTS). In an implementation, an electronic device provides a variety of functionality including at least functionality to determine position. The electronic device may be further configured to ascertain locations of one or more virtual traffic sensors. In at least some embodiments, locations of virtual traffic sensors are determined by the electronic device using a variety of VTS criteria. Using a determined position, the electronic device may detect proximity to the virtual traffic sensors. The electronic device may collect traffic related data when in proximity to the one or more virtual traffic sensors. The electronic device may then communicate the collected traffic data over a suitable network connection to a service provider.

This Summary is provided solely to introduce subject matter that is fully described in the Detailed Description and Drawings. Accordingly, the Summary should not be considered to describe essential features nor be used to determine scope of the claims.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Exemplary Environment

Figure 1:
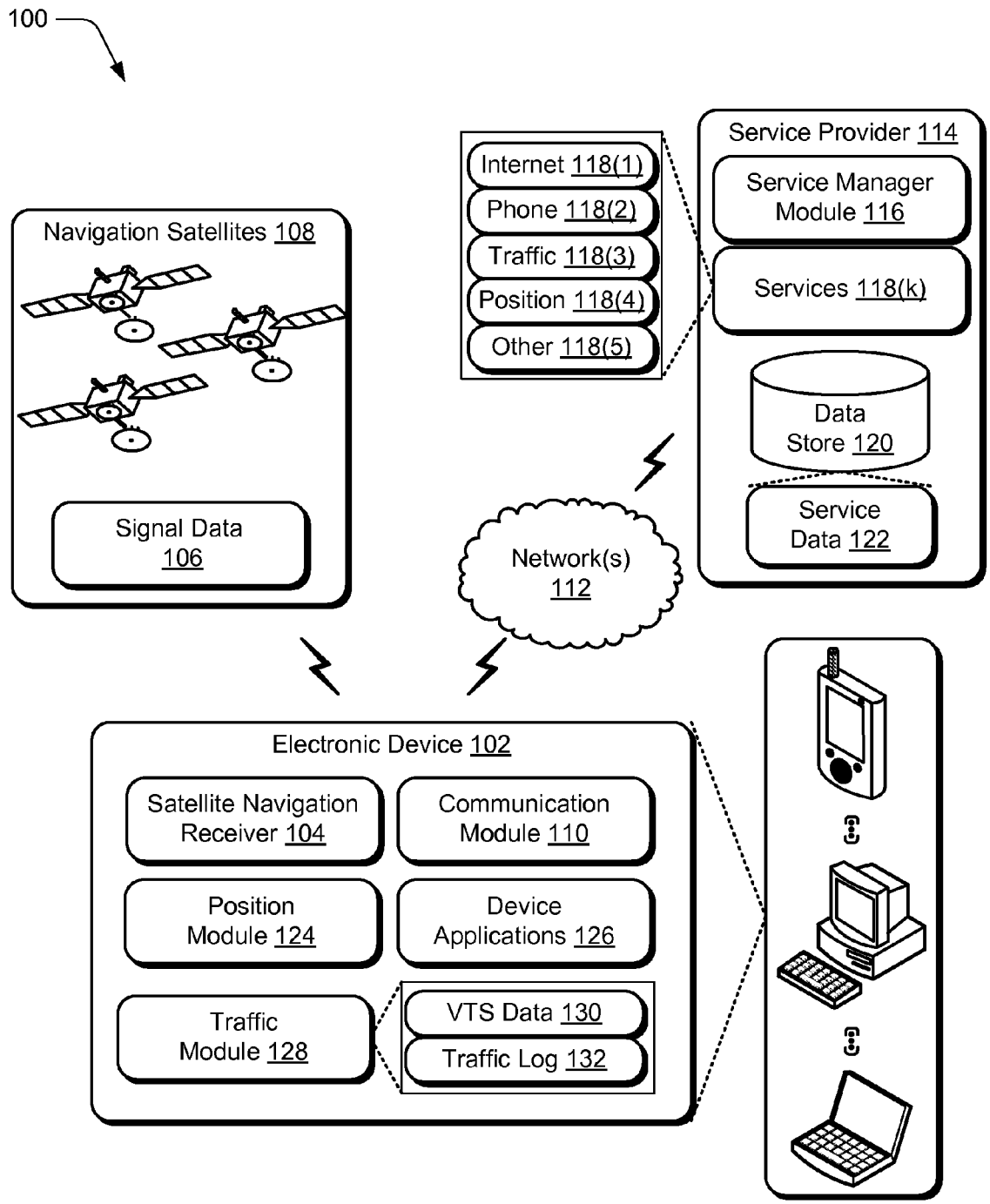
FIG. 1 depicts an exemplary environment in which virtual traffic sensor techniques may be employed.

FIG. 1 illustrates an implementation of an environment 100 in which techniques for virtual traffic sensors may be employed. In the depicted example, the environment 100 includes an electronic device 102. Electronic device 102 may be configured to provide a variety of functionality through various applications, components, modules, and operational modes of the electronic device 102. A variety of electronic devices 102 suitable to provide the variety of functionality are contemplated. For instance, an electronic device 102 may be configured as devices including, but not limited to: a mobile phone; a portable navigation device; a portable computer; a desktop computer; a personal digital assistant; a multimedia device; a game device; and/or combinations thereof. In the following description a referenced component, such as electronic device 102, may refer to one or more entities, and therefore by convention reference may be made to a single entity (e.g., the electronic device 102) or multiple entities (e.g., the electronic devices 102, the plurality of electronic devices 102, and so on) using the same reference number.

In an implementation, electronic device 102 includes functionality to determine position. For example, electronic device 102 is depicted as including a satellite navigation receiver 104 that represents functionality to receive signal data 106 from navigation satellites 108. Satellite navigation receiver 104 may be configured in a variety of ways such as a global positioning system (GPS) receiver, a GLONASS receiver, a Galileo receiver, or other satellite navigation receiver. Additionally or alternatively, the electronic device 102 may determine position using other methods, as is discussed in more detail below.

Electronic device 102 also includes a communication module 110 representative of communication functionality to permit electronic device 102 to send/receive data between different devices (e.g., components/peripherals) and/or over the one or more networks 112. Communication module 110 is representative of a variety communication components and functionality including, but not limited to: one or more antennas; a browser; a transmitter; a receiver; a wireless radio; data ports; software interfaces and drivers; networking interfaces; data processing components; and so forth.

The one or more networks 112 are representative of a variety of different communication pathways and network connections which may be employed, individually or in combination, to communicate among the components of the environment 100. Thus, the one or more networks 112 may be representative of communication pathways achieved using a single network or multiple networks. Further, the one or more networks 112 are representative of a variety of different types of networks and connections including but not limited to: the Internet; an intranet; a satellite network; a cellular network; a mobile data network; wired and/or wireless connections; a radio broadcast network; and so forth. Examples of wireless networks include but are not limited to networks configured for communications according to: one or more standard of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; and so on.

Wired communications are also contemplated such as through universal serial bus (USB), Ethernet, serial connections, and so forth.

For example, electronic device 102 (through functionality represented by the communication module 110) may be configured to communicate via one or more networks 112 with one or more service providers 114. FIG. 1 depicts an example service provider 114 that may include a service manager module 116 operable to manage and provide a variety of services 118($k$), where k may be any integer from 1 to "K". The example service provider 114 also includes a data store 120 that is representative of storage capacity that may be used to store a variety of service data 122 related to the services 118($k$).

Service manager module 116 is representative of functionality to configure services 118($k$), manage access to services 118($k$), provide services 118($k$) over a network 112, and so forth. Multiple services 118($k$) may be provided by a single service provider 114. Further, electronic device 102 may access multiple services providers 114 each configured to provide a different set of services 118($k$) via the one or more networks 112. By way of example and not limitation, services 118($k$) provided by one or more service providers are illustrated as including Internet 118(1) service, phone 118(2) service, traffic 118(3) service, and position 118(4) service.

Internet 118(1) service is representative of a variety of different types of Internet content and/or services, examples of which include but are not limited to web pages, location services, web services, music, video, email service, instant messaging, and so forth. Phone 118(2) service is representative of mobile phone and/or data services that may be provided by one or more service providers 114, such as by a cellular provider over a cellular network. Traffic 118(3) service may include traffic updates/alerts, routing and re-routing, delay notification, and so forth.

As described above and below, traffic 118(3) service may be provided, at least in part, based upon data collected by electronic device 102 using one or more virtual traffic sensors (VTS). VTS are logically defined locations that are used to indicate when and/or where an electronic device 102 may collect traffic related data. The VTS may represent logical abstractions of geographic locations. Thus, each virtual traffic sensor (VTS) is a logical sensor whose location, in relation to the currently traveled road segment, is determined by a set of VTS criteria. Flexible and strategic location of virtual traffic sensors according to VTS criteria can enable reduced data storage and communication cost for collection of traffic related data while maintaining good data quality. A variety of VTS criteria to locate VTS are contemplated, further discussion of which may be found in relation to the following figures. Traffic related data may be collected at or near locations of each virtual traffic sensor. The collected traffic related data may be communicated back to a central location (e.g., a service provider 114), where the collected data may be analyzed, stored, formatted, and/or otherwise manipulated to facilitate provision of traffic 118(3) service by one or more service providers 114. For instance, traffic related data may be stored in a data store 120 of a service provider 114 as service data 122.

Position 118(4) service is representative of position determining functionality that may be provided as a service from a service provider 114. Electronic device 102 may be configured to determine position via position 118(4) service in addition to or in lieu of determining position by way of signal data 106 received via a satellite navigation receiver 104 of the device. A variety of other 118(5) services that may be provided by way of one or more service providers 114 are also contemplated, examples of which include but are not limited to: radio data service, audio/video service, messaging service, and weather service.

As noted, electronic device 102 may be configured to determine position. More particularly, electronic device 102 may include a position module 124 that is configured to manage, use, and selectively switch between a variety of position sources and/or position-determining techniques to determine a geographic position of the electronic device 102. For instance, position module 124 may manage and process signal data 106 received from the navigation satellites 108 via the satellite navigation receiver 104. The electronic device 102 may receive signal data 106 transmitted by one or more position data platforms and/or position data transmitters, examples of which are the depicted as the navigation satellites 108. The position module 124 is representative of functionality operable to determine a geographic position through processing of the received signal data 106. The signal data 106 may include various data suitable for use in position determination, such as timing signals, ranging signals, ephemerides, almanacs, and so forth. Thus, position module may manage and process signal data 106 from navigation satellites 108 to provide a variety of position-determining functionality. In an embodiment, the satellite navigation receiver 104 is a GPS receiver operable to receive signal data 106 from navigation satellites 108 that are configured as GPS satellites in a GPS system.

In addition to determining position through the satellite navigation system as described, it should be apparent that a wide variety of other positioning systems may also be employed, such as terrestrial based systems (e.g., wireless-phone based systems that broadcast position data from cellular towers, such as through phone 118(2) service), wireless networks that transmit positioning signals, and so on. Any suitable position determining techniques may be employed. For example, positioning-determining functionality may be implemented through use of a server in a server-based architecture, from a ground-based infrastructure, through one or more sensors (e.g., gyros, odometers, and magnetometers), use of "dead reckoning" techniques, and so on. The position module 124 may also be configured to selectively switch between a variety of position-determining techniques that may be available through different position sources. Thus, in addition to using the navigation satellites 108, the position module 124 may also be configured to determine position by way of one or more service providers 114, such as determining position through Internet 118(1) service, phone 118(2) service, and/or position 118(4) service.

The electronic device 102 may include a variety of device applications 126 which may be configured to provide a wide range of functionality to the electronic device 102. The position module 124 may be operable to provide a determined position and/or other position data to the various device applications 126 to enable position dependent functionality. Position dependent functionality may include but is not limited to: indicating geographic position on a map; tracking speed and distance; weather service; traffic service; providing navigation instructions; providing trip data; conducting position based point of interest (POI) searches, database searches, and/or Internet searches; and so forth.

In accordance with virtual traffic sensor techniques described herein, the electronic device 102 may also include a device application 126 that is configured as a traffic module 128. The traffic module 128 is representative of various traffic related functionality that may be provided by an electronic device 102. For instance, traffic module 128 may be configured to receive traffic 118(3) service from one or more service providers 114. Further, traffic module 128 may be configured to collect various traffic related data and/or to cause communication of the collected traffic related data to the one or more service providers 114.

In one or more embodiments, traffic module 128 uses VTS data 130 to ascertain locations for virtual traffic sensors (VTS). Traffic module 128 is further operable to collect traffic data when in proximity to the VTS. In one or more embodiments, traffic module 128 may maintain a traffic log 132. When a suitable connection is available, such as connection by way of communication module 110 over the network 112 to service provider 114, traffic module 128 may cause communication of the traffic log 132 to the service provider 114. In other embodiments, communication of traffic related data may occur substantially in real-time, e.g., contemporaneously with (within a few minutes of) collection of the data. Further discussion of virtual traffic sensors to enable traffic related functionality of an electronic device 102 may be found in relation to the following figures.

Figure 2:
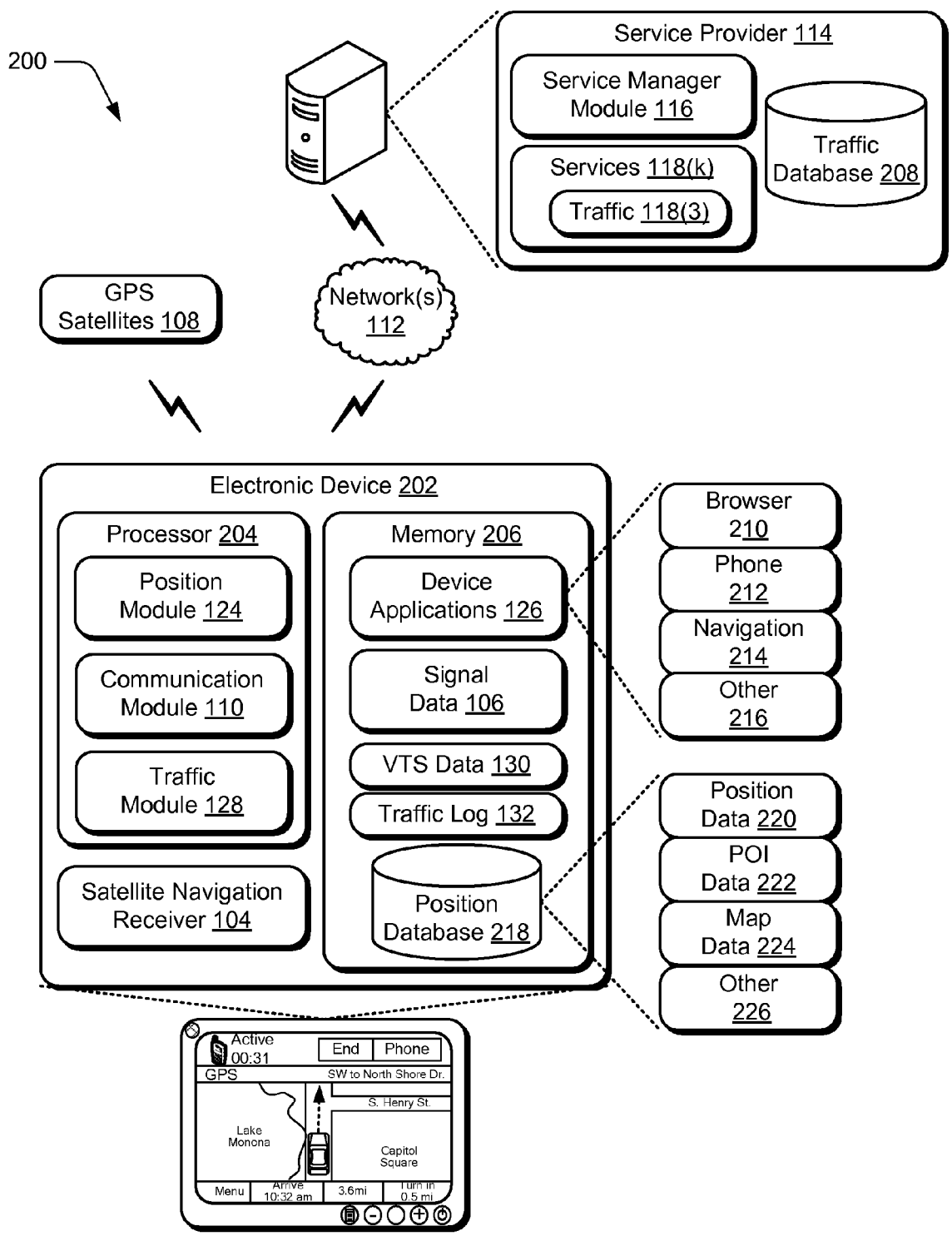
FIG. 2 depicts an exemplary implementation of a device to perform virtual traffic sensor techniques.

FIG. 2 depicts an implementation 200 of an example of electronic device 102 of FIG. 1 in greater detail. In particular, an example electronic device 202 configured as a portable navigation device (PND) is illustrated. The example electronic device 202 of FIG. 2 is illustrated as including a processor 204 and memory 206 that may be utilized to provide a variety of processing and storage capabilities.

Processor 204 is not limited by the materials from which it is formed or the processing mechanisms employed therein, and as such, may be implemented via semiconductor(s) and/or transistors (e.g., electronic integrated circuits (ICs)), and so forth. Additionally, although a single memory 206 is shown for the electronic device 202, a wide variety of types and combinations of memory may be employed, such as random access memory (RAM), hard disk memory, removable medium memory (e.g., the memory 206 may be implemented via a slot that accepts a removable memory cartridge), and other types of computer-readable media capable of storing data and program code executable by one or more processors.

In the example electronic device 202 of FIG. 2, the position module 124, communication module 110, and traffic module 128 are illustrated as modules that are executed via processor 204 and are also storable in the memory 206. It is noted generally that any of the functions described herein can be implemented using software, firmware, hardware (e.g., fixed logic circuitry), manual processing, or a combination of these implementations. The terms "module" and "functionality" as used herein generally represent software, firmware, hardware or a combination thereof. In the case of a software implementation, for instance, the module represents executable instructions that perform specified tasks when executed on a processor, such as the processor 204 with the electronic device 202 of FIG. 2. The program code can be stored in one or more computer-readable storage media, an example of which is the memory 206 associated with the electronic device 202 of FIG. 2.

The electronic device 202 may establish communication connections to service providers 114, such as a connection to a server of the service provider 114. Through execution of service manager module 116, service provider 114 may provide a variety of services 118(k) over a network 112 to the electronic device 102. The example service provider 114 of FIG. 2 is illustrated as configured to provide at least traffic 118(3) service. Service provider 114 through service manager module 116 may also maintain a traffic database 208. Traffic database 208 is representative of a portion of memory (e.g., data store 120 of FIG. 1) of a server corresponding to a service provider 114 that is arranged to store traffic related data. Examples of traffic related data that may be stored in traffic database 208 include but are not limited to: raw data from devices that is used for substantially real time provision of traffic service 208; historical traffic data that can be manipulated in various ways to identify traffic trends and patterns; traffic logs 132 collected from devices; and so forth.

The memory 206 of electronic device 202 is illustrated a storing various device applications 126, signal data 106 that may be received via the satellite navigation receiver 104, VTS data 130, and traffic log 132. The device application 126 are illustrated as including a browser 210, a phone 212 application, and a navigation 214 application. The browser 210 represents functionality executable on the processor 204 to interact with Internet 118(1) service from a service provider 114 configured as an internet provider, such as to obtain email service, send/receive instant messaging, view web pages, download video programs or other content, obtain traffic 118(3) service, and so forth. Phone 212 application represents functionality executable on the processor 204 to obtain phone 118(2) service from a service provider 114 configured as a cellular provider, such as to make and receive mobile phone calls, manage contacts, create/send/receive text messages, access Internet content over cellular, and so on.

Navigation 214 application represents functionality executable on the processor 204 to provide a variety of navigation functionality. For example, the navigation 214 application may be configured for outdoor navigation, pedestrian navigation vehicle navigation, aerial navigation (e.g., for airplanes, helicopters), marine navigation, personal use (e.g., as a part of fitness-related equipment), and so forth. The navigation 214 application for instance, may be executed to use signal data 106 received via a GPS receiver to generate navigation instructions (e.g., turn-by-turn instructions to an input destination), show a current position on a map, and so on. The navigation 214 application may also be executed to provide other navigation functionality, such as to determine a current speed, calculate an arrival time, and so on. Further, navigation 214 application may utilize traffic related data received through operation of the traffic module 128 for the purposes of route planning, re-routing, output of traffic notifications, enhanced calculation of arrival times, and so forth.

A variety of other 216 applications may also be included to provide additional functionality to the electronic device 202. Examples of other 216 applications may include but are not limited to: media applications, games, database, productivity suite, an operating system, drivers, desktop applications, device specific applications, and so forth. Thus, device applications 126 represent a wide variety of functionality that may be operable on the example electronic device 202.

Electronic device 202 is further illustrated as including a position database 218. Position database 220 is representative of a variety of data that may be maintained locally on an electronic device 202 to enable various position-determining techniques and/or navigation functionality. Examples of data that may be maintained in a position database 220 include but are not limited to: position data 220, point of interest (POI) data 222, and map data 224. A variety of other data 226 is also contemplated. Position data 220 is representative of various cached position data such as: cached signal data 106; historical position data; routes and patterns; position source selection criteria, and so forth.

POI data 222 represents data describing various places such as businesses, offices, parks, and so forth that users of the electronic device 202 may be interested in, e.g., points of interest (POIs). POI data 222 may be used to locate various types of POIs, such as through displaying hotels, restaurants, fuel, ATMs, and so forth on a map and/or providing instructions to navigate to various POIs. In an embodiment, virtual traffic sensor (VTS) may be configured as POI's having particular characteristics and functions. That is, proximity to POIs defined as VTS may trigger collection and/or communication of traffic related data. In this embodiment, VTS may be implemented through adaptation of existing POI databases to include VTS locations as POIs.

Map data 224 represents various types of maps (e.g., road, topographic, hybrid, satellite) and related data that may be used by electronic device 202 to provide various position-determining techniques and/or navigation functionality, such as showing position on a map, calculating turn-by-turn navigation instructions, display of POIs, and so on. Map data 224 may also be used by traffic module 128 to ascertain locations for VTS. For instance, a determined position along with map data 224 may be used to understand characteristics of roads along a route, such as intersection locations, road class, and so forth.

Traffic module 128 may use the road characteristics along with other VTS criteria to locate one or more VTS locations along the route. As noted, VTS data 130 may include various VTS criteria that may be employed to locate VTS, further discussion of which may be found in relation to the following figures. VTS data 130 may also include pre-defined VTS locations (recommended and/or default locations) that may be defined by a service provider 114. Electronic device 202 may be pre-loaded with a set of pre-defined VTS that are updatable over a network 112, such as via service provider 114. Traffic module 128 may use the pre-defined VTS location directly. Additionally or alternatively, traffic module 128 may be operable to define its own VTS locations based upon the VTS criteria, alone or in conjunction with the pre-defined VTS locations. Then, a determined position may be used to detect proximity to the VTS locations. When proximity to a VTS location is detected, traffic module 128 operates to collect various traffic related data. Traffic related data may be communicated substantially in real-time to a service provider 114, when a suitable connection is available. Additionally or alternatively, traffic related data may be stored as a traffic log 132 and communicated at a later time, such as when a suitable connection is available. A variety of other examples are also contemplated.

While position database 218 is illustrated as stored locally on electronic device 202, it is contemplated that portions of the data may be maintained in a remote storage location, such as being maintained by a service provider 114 configured to provide the data as a service. The electronic device 202 may interact with the remote storage location to perform updates of data maintained locally in the position database 220. Updating may also include updating VTS data 130, such as updating pre-defined locations for VTS and/or VTS criteria. In addition to or in lieu of maintaining data locally in a position database 220, electronic device 202 may use portions of the data represented by position database 220 directly from a remote storage location, e.g., without maintaining the data in local storage. Further discussion of these and other features of virtual traffic sensor techniques may be found in relation to the following procedures.

Exemplary Procedures

The following discussion describes example techniques for virtual traffic sensors that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the environment 100 of FIG. 1 and the example devices of FIG. 2. The features of techniques described below are platform-independent, meaning that the techniques may be implemented on a variety of commercial computing platforms having a variety of processors.

Data Collection Examples

Figure 3:
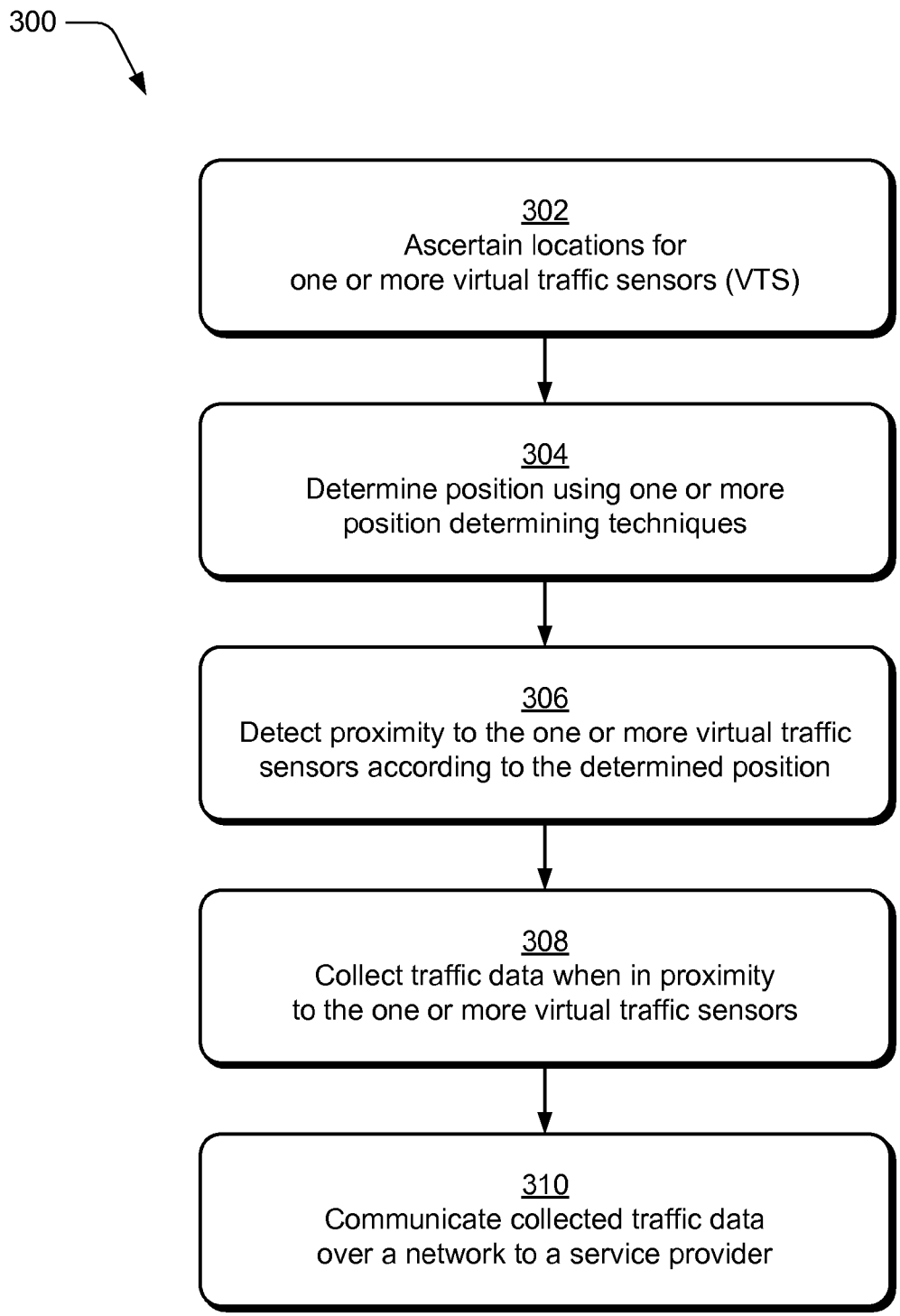
FIG. 3 is a flow diagram depicting an exemplary procedure in accordance with one or more embodiments.

FIG. 3 depicts a procedure 300 in an exemplary implementation in which a electronic device, such as a portable navigation device, employs virtual traffic sensors (VTS) to collect traffic related data. Locations for one or more virtual traffic sensors are ascertained (block 302). For instance, a traffic module 128 of an electronic device 102 can be configured to ascertain locations for VTS along a travel route. One way this may occur is by storing locations for VTS in a database on the electronic device 102. For example, VTS data 130 may include a database of locations of virtual traffic sensors. VTS data 130 can also include various criteria that may be employed to arrive at locations for VTS. The locations of VTS may include either or both of pre-defined locations that are provided by a service provider 114, initially provided by the manufacturer of the electronic device 102, and/or locations that are determined by way of the traffic module 128 at an electronic device 102 according to the various criteria. Data related to traffic conditions is collected at or near each virtual traffic sensor location. Strategic placement of virtual traffic sensors may reduce data storage and transportation cost while maintaining good coverage.

As the virtual traffic sensors (VTS) are logically defined locations, the data collection points are not constrained by the location of physical elements, such as communication infrastructure components, physical data collection components located along roadways, and so forth. Accordingly, cost associated with deployment may be reduced. Further, the sensor locations may be flexibly arranged and re-arranged with little associated time and/or cost. New VTS criteria and/or locations for VTS may be quickly defined and distributed to devices to change the arrangement of VTS.

In contrast, traditional techniques may rely upon fixed infrastructure for data collection points. Additionally, traditional techniques for traffic data collection may operate by feeding current traffic conditions from devices to a server at a periodic time interval. However, if the feedback is set too frequently, it may create redundant information and overload server resources, thereby increasing cost and potential failures. On the other hand, if time interval is set too long, critical situations may fall between intervals and therefore may be missed. Further, the time interval approach may not consider differing road characteristics or conditions, such as considering whether the road is in a city or out in the country. Accordingly, the frequency with which data is fed to the server may not be adjusted to account for the differing road characteristics or conditions.

By using configurable VTS criteria to strategically locate VTS, flexibility to arrange and re-arrange the locations is achieved. Moreover, the criteria used to select VTS locations may take into account a variety of factors to reduce communication of redundant or useless data, prevent overloading of devices and servers by over communication, and provide an adaptable system that can be adjusted easily and cost effectively.

A variety of criteria suitable to enable determination of locations for VTS are contemplated. VTS criteria may include, but are not limited to: (1) route characteristic criteria, (2) delay criteria, and (3) traffic trend criteria. Route characteristic criteria refer to characteristics related to a traveled or planned route and the roadways of the route. Route characteristics may be derived from map data 224 that is correlated to determined positions and/or to a planned route. Using the route characteristics, VTS may be strategically located in "high" traffic areas, for example around major intersections, along major thoroughfares, in city areas, and so forth. Relatively fewer VTS may be located in rural areas, on major highways along open stretches, and in other areas where traffic problems may occur infrequently. In this manner, resources of both devices and servers may be directed to obtaining quality traffic data in areas that are more likely to experience traffic problems. Examples of route characteristics include but are not limited to: distance to the coming intersection and/or between intersections; length of the currently traveled road segment; type of the upcoming intersection; road class; terrain of a traveled route (flat, mountainous); and so forth.

Delay criteria refer to factors from which travel time differences may be inferred. The number of VTS and/or locations for VTS may depend upon an expected travel time and delays for a route. For instance, more VTS may be defined for a route for which delays are expected so that accurate delay information can be obtained. Examples of delay criteria may include weather conditions (e.g., rain, snow); seasonal traffic differences (winter vs. summer); known traffic accidents or other incidents; constructions zones; special events (parades, sporting games, rock concerts), and so forth. Delay criteria may be used to dynamically locate VTS, such as adding VTS to a rural route when a accident occurs, locating a VTS at ingress and egress routes to a stadium at the time of a sporting event, and so forth.

Traffic trend criteria refer to a variety of historic traffic trends that may depend upon such items as the time of day, day of the week, calendar (e.g. holiday and seasonal traffic trends), and other items to which traffic trends may be associated. For example, fewer VTS may be located along a city route on a Saturday than on a Monday. Likewise on a route used by weekend travelers, more VTS may be located on a Friday afternoon than on a Friday morning. Thus, various traffic trend criteria may be employed to inform the determination of where to locate VTS.

Other VTS criteria are also contemplated. For instance, a system administrator may define various constraints designed to improve data quality. For example, a maximum travel time between virtual traffic sensors (VTS) may be defined. Thus, along rural routes VTS may be dynamically located so that traffic data is collected and/or reported at least every hour. Similarly, a maximum time to an upcoming VTS (e.g., an already determined VTS location) may be defined. When an electronic device 102 does not reach the upcoming VTS before the maximum time, a traffic incident or other delay may have occurred. Thus, the device may be configured to report and/or record traffic condition when the maximum time has been reached.

Various VTS criteria may be associated with different priorities and weight. The combination of the priorities and weight of these criteria may be used in the determination of the location of a VTS for a specific geographic area and/or route. As noted the VTS criteria can be parameterized and made configurable. Each electronic device 102 can be pre-loaded with VTS criteria and/or can receive the VTS criteria when the device connects to the central server. In an embodiment, VTS criteria are managed by the system administrator so they can be adapted as required. Since the central server (e.g., service provider 114) knows the location of each device when it is connected, the VTS criteria communicated to devices may be specific to geography. Thus, a set of VTS criteria communicated in New York City may be different than a set of VTS criteria that is communicated in Fargo or Seattle.

Position is determined using one or more position determining techniques (block 304). For instance, electronic device 102 may be configured to determine position using a plurality of position determining techniques as discussed previously. In an implementation, an electronic device 102 may use a satellite navigation receiver 104 to obtain signal data 106 from navigation satellites 108 that may be used to determine a position of the electronic device. An electronic device 102 may also obtain position via position 118(4) service from a service provider 114.

Proximity is detected to one or more VTS according to the determined position (block 306). For instance, an electronic device 102 may utilize a determined position to detect when the device is at or near to a VTS location. One way this may occur is through correlation of map data 224 with VTS data 130 that describes locations for VTS. A geographical location may be identified on a map based upon map data 224 and position determined through one or more position determining techniques. As noted, in one embodiment the VTS locations may be configured as a distinct type of points of interest (POIs) that are logically defined to control where traffic data is collected by suitably configured electronic devices 102. Thus, if an intersection of a main city thoroughfare is associated with a VTS, determined position may be used to detect proximity to the intersection and accordingly, proximity to the VTS. In particular, traffic module 128 may be configured to use determined position to monitor proximity to VTS and detect when the electronic device has arrived at the intersection and the corresponding VTS. A threshold value such as "within 50 meters", "within 200 meters", or "within 500 meters" may be configured to control how close a device is to a VTS when the traffic module 128 detects proximity to the VTS.

Traffic related data is collected when in proximity to the one or more virtual traffic sensors (block 308). For example, when proximity is detected, traffic module 128 may operate to trigger collection of various traffic data. The traffic module 128 may populate a variety of parameters and create a record that is associated with the particular VTS. Examples of parameters that may be collected at each VTS include but are not limited to: a VTS identifier, time, date, position information, map version data, vehicle identifier, subscriber/device identifier, and various traffic related parameters. By way of example and not limitation, traffic related parameters may include time intervals between VTS, device speed, device heading, road characteristics, vehicle route information, and so forth.

Collected traffic data is communicated to a service provider over a network (block 310). In an embodiment, a record of traffic data collected at a VTS location may be communicated substantially in real-time. For instance, if a network connection is available (e.g., WiFi, Cellular, etc.) then an electronic device 102 may be configured to communicate real-time traffic data back to a central collection point, such as to a service provider 114. Additionally or alternatively, electronic device 102 may maintain a traffic log 132 that may be communicated at a later time. For instance, the traffic log 132 may be maintained for communication when the device obtains a suitable network connection. In an embodiment, a small form factor device may obtain a suitable connection using another device, such as connecting a portable navigation device (PND) to a home computer and utilizing the capabilities of the home computer to communicate the traffic log 132 to the central collection point (e.g. a server of a service provider 114). The reported traffic condition may then be processed into useful format to provide a data source for real time traffic solutions and/or to facilitate provision of traffic 118(3) service to devices.

Figure 4:
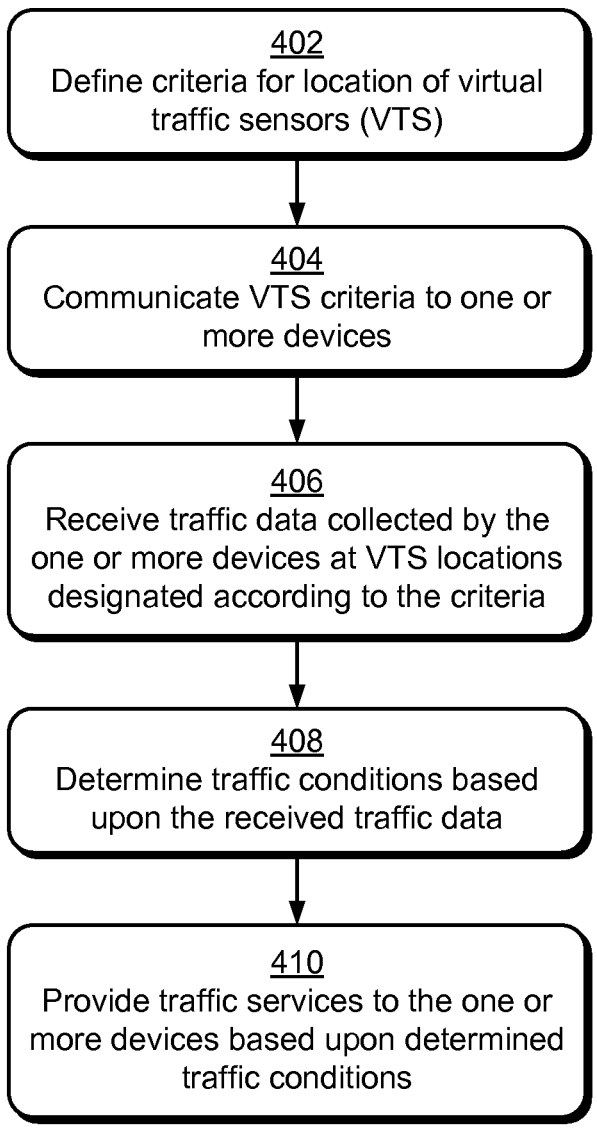
FIG. 4 is a flow diagram depicting an exemplary procedure in accordance with one or more embodiments.

FIG. 4 depicts a procedure 400 in an exemplary implementation in which collected traffic related data is employed to provide traffic services. Criteria are defined for location of virtual traffic sensors (block 402). For example, service provider 114 may generate configurable VTS criteria that may be used to locate virtual traffic sensors. A variety of VTS criteria as discussed in relation to FIG. 3 may be defined. The VTS criteria may be dynamically configured to provide flexibility to adapt the traffic system to improve data quality or otherwise make adjustments.

The criteria are communicated to one or more devices (block 404). For instance, VTS criteria configured dynamically at a service provider 114 can be downloaded/updated when an electronic device 102 connects to a server of the service provider 114. VTS criteria may be stored locally at a device, for example as part of VTS data 130. Service provider 114 may also provide pre-defined VTS locations that may also be stored as VTS data 130.

Traffic data is received that is collected by the one or more devices at VTS locations designated according to the criteria (block 406). For example, electronic devices 102 may utilize VTS data 130 to locate VTS. The devices then collect traffic related data based upon the location of the VTS. Data may be collected by way of a traffic module 128 that detects proximity to VTS and generates a data record corresponding to the VTS. A variety of data may be collected at each VTS as discussed in relation to FIG. 3. The traffic module 128 may communicate the collected data to a service provider 114 as real-time data and/or as data that has been compiled into a traffic log 132.

Traffic conditions are determined based upon the received traffic data (block 408). Collected traffic data may be processed in a variety of ways to understand traffic conditions. For instance, collected traffic data may be analyzed to detect traffic incidents or other delays, calculate realistic travel times, and so forth. Collected traffic data may also be analyzed to identify trends, seasonal changes, alternate route options, and so forth.

Traffic services are provided to the one or more devices based upon the determined traffic conditions (block 410). For instance, traffic 118(3) service provided by one or more service providers may be based upon traffic data collected using VTS techniques herein. For instance, traffic 118(3) service may include traffic updates, traffic alerts, routing and rerouting, delay notification, visual display of traffic conditions at an electronic device 102, route planning assistance, improved arrival time calculation, and so forth. In an implementation, a service provider 114 collecting the data may provide raw traffic data to various other providers who may process the data to determine traffic conditions. The collected data may be made available to numerous service providers 114 to enhance existing traffic solutions. Thus, data collected by logically defined VTS may be used by one or more service providers 114 to enable traffic services 118(3) to be provided.

System Architecture Example

Figure 5:
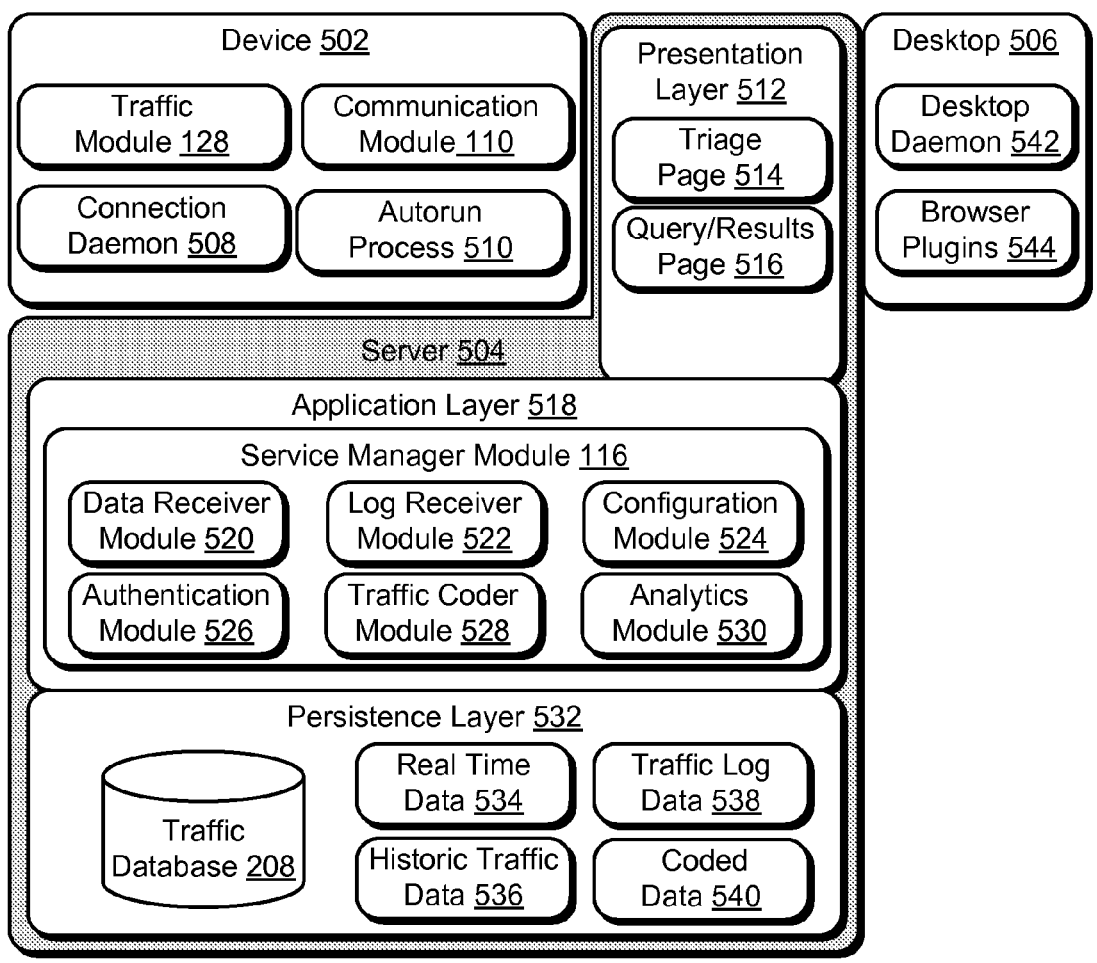
FIG. 5 depicts a system in which virtual traffic sensor techniques may be employed.

FIG. 5 depicts an example traffic system generally at 500 that is suitable to employ one or more embodiments of virtual traffic sensors described herein. The traffic system 500 depicts example system architecture level components that may be implemented in software, hardware, or combinations thereof. The traffic system 500 is illustrated as including an example device 502, example server 504, and an example desktop 506 computing device. In one or more embodiments the device 502 may be communicatively coupled to the server 504 via a suitable network connection. In one or more other embodiments, the device 502 may be communicatively coupled to the server 504 by way of a suitable interface to the desktop 506. Thus, a device 502 may be configured to implement aspects of virtual traffic sensor techniques using both "onboard" (local resources/processing) and "offboard" (server-client resources/processing) resources in varying combinations.

A device 502 having substantially capabilities and resources (e.g., a mobile computing device) may establish a direct connection to the server 504, such as via a wireless network connection. Another device 502 having a small form factor may have relatively fewer capabilities and resources (e.g., a mobile phone). To improve performance, such a small form factor device 502 may be configured to offload processing tasks to the server side and/or may establish connections through an external device, such as using a wired (USB, serial, etc.) or wireless (Wifi, Bluetooth, etc.) connection to the example desktop computer 506 that has greater capabilities and network connectivity. A device 502 may also be configured to toggle between "onboard" and "offboard" in different situations, such as to optimize performance, manage resources (e.g., battery life and processor time), and so on.

Descriptions of each of the depicted architecture level components can be found in the following discussion. The traffic module 128 implements client-side functionality for virtual traffic sensor techniques. Traffic module 128 provides various functionality to determine locations for VTS as described herein. Further, traffic module 128 may operate to detect proximity to VTS, collect real-time traffic data based on VTS locations, maintain a traffic log 132, and cause communication of collected traffic data to service providers 114.

Communication module 110 as described in relation to FIG. 1 is also illustrated as being implemented as a component of device 502. Communication module 110 may include a connection daemon 508. Connection daemon 508 component is representative of functionality for detecting when a device has a suitable data connection to networks 112, servers, and/or service providers 114. For instance, the connection daemon 508 may detect a WiFi or another suitable network connection. Device 502 may also implement an autorun process 510. When a device 502 has a suitable network connection 112, the autorun process 510 may be invoked to automatically upload traffic log 132 and/or other data to the traffic server, e.g., to a service provider 114. Autorun process 510 may be implemented in a variety of ways such as being a standalone component, a component of the traffic module 128, and so forth.

Server 504 may include a presentation layer 512. The presentation layer 512 is representative of functionality operable to output interfaces that may be used to interact with the traffic system and traffic related data. For instance, an administrator may utilize features of the presentation layer 512 to configure aspects of the traffic system, perform analysis, manipulate traffic data, troubleshoot problems, and so on. Examples of interfaces that may be output via the presentation layer include a triage page 514 and a query page 516. Triage Page 514 may be output to display internal statistics, history of activities, and database states to help troubleshooting or "triaging" issues that may arise in the traffic system 500. Query Page 516 may be output to provide various data manipulation to support various triage situations. The administrator may perform various data queries through query pages 516, such as retrieving historic data, monitoring device connections, examining system attributes, viewing data logs, and so forth.

Server 504 may also include an application layer 518. The service manger module 116 of a service provider 114 may be implemented in the application layer 516. A variety of modules to provide traffic 118(3) service and aspects of virtual traffic sensor techniques described herein may be implemented as sub-components of the service manager module 116. For instance, in the example of FIG. 5, service manager module 116 includes a data receiver module 520, a log receiver module 522, a configuration module 524, an authentication module 526, a traffic coder module 528, and an analytics module 530.

Data receiver module 520 is representative of functionality operable to receive and/or process real time data from a plurality of devices 502. In particular, data receiver module 520 may receive data that is communicated from devices 502 when the devices 502 detect proximity to VTS. Data receiver module 520 may receive datagrams from the devices 502 containing real time traffic data, manipulate the data, and store the data to a database. The data may then be made accessible for use by various entities, one of example of which is making the data accessible to one or more services providers 114 to facilitate provision of traffic 118(3) service.

Log receiver module 522 is representative of functionality operable to receive and/or process traffic logs 132 communicated from devices 502. Log receiver module 522 may save the log data into a database for further processing, such as to generate historical traffic data and trends. Log receiver module 522 may also convert traffic logs 132 into a suitable format, parse the logs 132, or otherwise manipulate the traffic logs 132 for storage and/or further processing.

Configuration module 524 is representative of functionality operable to make adjustments to update settings, change parameters, fine tune VTS criteria and/or locations, update settings for devices 502, and otherwise configure the components of the traffic system. Configuration module 524 enables the traffic system to be flexible in a variety of ways. Configuration module 524 may provide an administrator various configurable options to adjust the traffic system. Configuration module 524 may also enable control of system behavior at run time. For instance, each time a device 502 is connected to the server 504, the device may interact with the configuration module 524 to identify and obtain available updates. Configuration module 524 provides functionality to download configuration parameters, VTS criteria, VTS locations, and associated values to the devices. For instance, configuration module 524 may be configured by an administrator with updates to VTS criteria or VTS locations that may then be populated to the devices 502 when the devices 502 connect to the server 504 and interact with configuration module 524.

Authentication module 526 is representative of functionality to authenticate devices 502 to manage access to services 118(k), verify identity of devices 502, exclude unauthorized devices and/or or subscribers, and otherwise determine authorizations to access services 118(k), upload traffic data, and so forth. A variety of suitable authentication techniques are contemplated. Authentication module 526 may communicate with a subscriber database to determine which devices 502 are authorized and to which services 118(k) the devices 502 are given access. Authentication module 526 may also implement functionality to track interaction with traffic services 118(3), traffic data, and/or other services 118(k) on a device and/or subscriber basis.

Traffic coder module 528 represents functionality to code received traffic data into a standard format for distribution to devices 502 and subscribers. One example format is a format compatible with Traffic Message Channel (TMC) technology. In this example, traffic coder may code traffic data in accordance with TMC protocols. This may involve parsing of the traffic data into traffic event codes that are associated with location codes. The event/location combinations may be communicated to devices as part of traffic 118(3) service. One way this may occur is through FM broadcasts that includes the coded TMC data. To assign location codes to traffic events, traffic coder module 528 may utilize a location code table that relates position data included in the traffic data to the standardized location codes. While TMC coding is discussed by way of example, traffic coder module 528 may be configured to code traffic data into a variety of suitable standardized formats.

Analytics module 530 is representative of a variety of functionality to manipulate, analyze, and otherwise process traffic data that is collected from various devices 502. The analytics module 530 may operate to generate reports, traffic alerts, and so forth based upon analysis of collected traffic data. Analytics module 530 may also determine optimal routing and re-routing based upon analysis of collected traffic data. Further, the analytics module 530 may perform historical processing tasks. For instance, analytics module 530 may periodically pull data from traffic log 132. Analytics module 530 may analyze the log data and calculate effective travel speed of various time slots, conditions, vehicle types, road classes, road segments, and so forth. The result of calculations performed by analytics module 530 may be persisted in a traffic database 208 that may be referenced to provide traffic 118(3) service to devices 502. Analysis of traffic data via analytics module 530 may also be used to adjust VTS locations and/or VTS criteria that may be used to determine VTS locations. While illustrated as a component of the service manager module 116, analytics module 530 may also be provided as a standalone module of the server 502, by way of a different server, either on-line or off-line, and so forth.

Components in persistence layer 532 are responsible for storing data and may support various queries to utilize and manipulate the data. Traffic database 208 may be implemented in the persistence layer 532 to store a variety of data related to virtual traffic sensor techniques. Some examples of such data include but are not limited to: real time data 534 that may be received by the data receiver module 520; historic traffic data 536 compiled through operation of the analytics module 530; traffic log data 538 from one or more devices 502 received via the log receiver module 522; and coded data 540 that may be generated through operation of the traffic coder module 528. Other examples of data that may be stored in traffic database 208 include VTS locations, criteria used to determine VTS locations, and other data that may be made available at server 504 to implement aspects of virtual traffic sensor techniques.

Components in desktop 506 are representative of functionality and interfaces to connect devices to the server 504 via desktop 506. Desktop 506 is illustrated as including a desktop daemon 542 and various browser plug-ins 544 to facilitate connection of a device 502 to the server 504. When connected through the desktop 506, a device 502 is able to interact with the server 504 and may offload various tasks to the desktop to improve performance. As noted a device 502 may also be configured to establish a direct connection to the server 504, e.g., without having to connect through the desktop 506.

CONCLUSION

Various techniques for virtual traffic sensors have been described. Although techniques for virtual traffic sensors have been described in language specific to structural features and/or methodological acts, it is to be understood that the appended claims are not necessarily limited to the specific features or acts described. Rather, the specific features and acts are disclosed as exemplary forms of implementing the claimed devices and techniques for virtual traffic sensors.

What is claimed is:

1. An electronic device comprising:
   a processor;
   memory coupled to the processor, the memory storing:
      a position module operable via the processor to determine a position of the electronic device using one or more position determining techniques; and
      a traffic module operable via the processor to:
         ascertain a pre-defined location for one or more virtual traffic sensors that logically define geographic locations at which traffic data is to be collected;
         detect proximity to said one or more virtual traffic sensors using the determined position; and
         collect traffic data for communication to a service provider responsive to detecting proximity to said one or more virtual traffic sensors, such that the traffic module does not continuously collect traffic data.

2. An electronic device as recited in claim 1, further comprising a satellite navigation receiver to enable receiving of signal data from a plurality of satellites, wherein the position module determines the position based upon the signal data received via the satellite navigation receiver.

3. An electronic device as recited in claim 1, wherein the electronic device is configured as a portable navigation device.

4. An electronic device as recited in claim 1, further comprising a communication module to provide the collected traffic data over a network to the service provider.

5. An electronic device as recited in claim 1, wherein the device is configured to communicate the collected traffic data wirelessly from the device.

6. An electronic device as recited in claim 1, wherein collecting traffic data comprises creating a traffic log for communication to the service provider when a network connection is available.

7. An electronic device as recited in claim 1, further comprising an interface configured to operably couple the electronic device to a computing device through which the collected traffic data is communicated to the service provider.

8. An electronic device as recited in claim 1, wherein the communication of the collected traffic data to the service provider occurs substantially in real time.

9. An electronic device as recited in claim 1, wherein the ascertaining includes determining locations for said one or more virtual traffic sensors (VTS) at the electronic device based upon VTS criteria communicated to the electronic device by the service provider.

10. An electronic device as recited in claim 9, wherein the VTS criteria includes: route characteristic criteria; delay criteria; and traffic trend criteria.

11. An electronic device comprising:
    a processor;
    memory coupled to the processor, the memory storing:
       a position module operable via the processor to determine a position of the electronic device using one or more position determining techniques; and
       a traffic module operable via the processor to:
          ascertain a pre-defined location for one or more virtual traffic sensors that logically define geographic locations at which traffic data is to be collected;
          detect proximity to said one or more virtual traffic sensors using the determined position; and
          collect traffic data for communication to a service provider responsive to detecting proximity to said one or more virtual traffic sensors,
          wherein the pre-defined location is communicated to the electronic device by the service provider.

12. An electronic device as recited in claim 1, wherein the electronic device is operable to receive defined locations of the one or more virtual traffic sensors (VTS) over a network from the service provider.

13. An electronic device as recited in claim 1, wherein the ascertaining includes:
    referencing map data according to a position determined through the position module;
    determining characteristics of a route using the referenced map data, and
    locating the one or more virtual traffic sensors (VTS) along the route based upon the determined characteristics of the route.

14. An electronic device as recited in claim 1, wherein the determined position is provided by the service provider.

15. A method comprising:
    storing in an electronic memory data describing a plurality of pre-defined virtual traffic sensors to logically define geographic locations at which traffic data is collected by an electronic device;
    collecting traffic data responsive to detecting proximity to the plurality of virtual traffic sensors using the electronic device, such that the traffic module does not continuously collect traffic data; and
    communicating the collected traffic data from the electronic device to a service provider.

16. A method as recited in claim 15 further comprising:
    obtaining criteria to define the locations of the plurality of virtual traffic sensors over a network from the service provider; and
    ascertaining the locations of the plurality of virtual traffic sensors according to the criteria.

17. A method as recited in claim 16, wherein the criteria includes: route characteristic criteria; delay criteria; and traffic trend criteria.

18. A method as recited in claim 16, wherein the pre-defined location is communicated to the electronic device by the service provider.

19. A method as recited in claim 16, wherein the ascertaining includes:
    referencing map data according to a position of the electronic device;
    determining characteristics of a route using the referenced map data, and
    locating the one or more virtual traffic sensors along the route based upon the determined characteristics of the route.

20. A method as recited in claim 15, further including redefining the location of one or more of the virtual traffic sensors.

21. A method as recited in claim 15, further comprising:
    determining a position of the electronic device using one or more position determining techniques; and
    comparing the determined position to the logically defined geographic locations of the plurality of virtual traffic sensors to perform the detecting proximity.

22. A method comprising:
    defining a set of criteria for locations of a plurality of virtual traffic sensors;

communicating the set of the criteria over a network to one or more devices to enable the devices to identify the location of the virtual traffic sensors;

receiving traffic data collected by the one or more devices at one or more of the virtual traffic sensor locations, such that the devices do not continuously collect traffic data;

determining traffic conditions based upon the received traffic data; and providing traffic services to the one or more devices based upon the determined traffic conditions;

wherein defining the set of criteria includes maintaining a database of pre-defined locations for virtual traffic sensors.

23. A method as recited in claim 22, wherein communicating the set of criteria includes communicating the pre-defined locations to the one or more devices.

24. A method as recited in claim 22, wherein the criteria includes route characteristics.

25. A method as recited in claim 22, wherein the criteria includes a time of day and a day of the week.

* * * * *